United States Patent [19]
Takizawa

[11] Patent Number: 6,139,155
[45] Date of Patent: Oct. 31, 2000

[54] PROJECTOR DISPLAY DEVICE

[75] Inventor: Takeshi Takizawa, Shiojri, Japan

[73] Assignee: Seiko Epson Corporation, Tokyo, Japan

[21] Appl. No.: 09/347,920

[22] Filed: Jul. 6, 1999

[30]     Foreign Application Priority Data

Jul. 7, 1998   [JP]   Japan ................................. 10-192147

[51] Int. Cl.⁷ ................................................ G03B 21/16
[52] U.S. Cl. .............................................. 353/57; 353/60
[58] Field of Search ................................ 353/52, 57, 58, 353/60, 61, 119

[56]               References Cited

U.S. PATENT DOCUMENTS 5,651,599   7/1997   Fujimori et al. ........................... 353/61
5,951,136   9/1999   Furuhata et al. ........................... 353/61
6,007,205   12/1999  Fujimori .................................... 353/60

*Primary Examiner*—William Dowling
*Attorney, Agent, or Firm*—Oliff & Berridge, PLC

[57]                 ABSTRACT

A projection display device that promotes size reduction thereof, and that allows an optical system including optical modulation devices to be equitably and efficiently cooled. The projection display device includes a head body having an optical modulation device, a color synthesizing optical system, and a projection lens mounted thereon, a fan disposed in the head body, and a fan frame mounted on a prism bearing face at a plurality of points so as to hold the fan. The fan frame has a face that faces the prism bearing face and is shaped substantially like a quadrangle in outline, and one of the two diagonal lines of the quadrangle extends along the plane orthogonal to the prism bearing face. This makes it possible to mount the fan frame close to the projection lens side, and to thereby promote size reduction.

7 Claims, 9 Drawing Sheets

PROJECTOR DISPLAY DEVICE

BACKGROUND OF THE INVENTION

1. Field of Invention

The present invention relates to a projection display device, and more particularly, to a technique for achieving size reduction and for efficiently cooling an optical system including optical modulation devices inside the device.

2. Description of Related Art

Hitherto, a projection display device has been known which comprises a light-source lamp, an optical system for forming an optical image according to image information by optically processing a light beam emitted from the light-source lamp, a projection lens for enlarging and projecting the image formed by the optical system onto a projection plane, and a power supply for supplying electric power for driving the device. In such a projection display device, the optical system generally includes a color separation optical system for separating light from the light-source lamp into three colors, optical modulation devices for respectively modulating the separated three color beams, and a color synthesizing prism for synthesizing the modulated light beams. The optical modulation devices are placed on a head body having high rigidity inside the device so that images formed by the three optical modulation devices will not be projected offset from one another.

Such projection display devices are widely used for multimedia presentations at conferences, academic meetings, exhibitions, and the like.

While the projection display device is sometimes kept installed in a conference room or the like for a presentation, it is sometimes brought in as necessary, or is stored in another place after use. Therefore, improved portability of the projection display device is desirable to facilitate transportation, and the device must be further reduced in size.

In reducing the size of the device, however, various components are densely placed inside the device, and it is difficult to circulate cooling air drawn in by a fan or the like. Therefore, devices are adopted to sufficiently cool heat-producing components. Since the optical modulation devices are particularly apt to produce heat, a cooling air inlet is provided below the optical modulation devices so as to cool the optical modulation devices, and forcible cooling is performed by an intake fan disposed on the lower surface of the head body. A general type of intake fan is mounted to a rectangular frame, and is fixed by screwing four corners of the frame to the lower surface of the head body.

A structure in which the fan is always fixed at four corners, however, sometimes hinders reduction in size and thickness of the device. For example, (1) when the front side (projection lens side) of the head body is thickened to secure a margin for mounting the fan, the head body becomes large, which is contrary to the purpose of reducing the size of the overall device. (2) When the fan is mounted on the head body offset to the rear side in order to solve this problem, since the rotation center of the fan and the midpoint among the three optical modulation devices are misaligned, it is difficult to uniformly cool the optical modulation devices. (3) When a small intake fan is employed to align the center of the intake fan with the midpoint among the three optical modulation devices, cooling is insufficient.

SUMMARY OF THE INVENTION

An object of the present invention is to provide a projection display device that promotes size reduction thereof, and that allows optical modulation devices to be equitably and efficiently cooled.

A projection display device of the present invention has three optical modulation devices for modulating three color beams, a color synthesizing optical system for synthesizing the three color beams modulated by the optical modulation devices, and a projection lens for projecting the light beams synthesized by the color synthesizing optical system, the color synthesizing optical system having a prism containing two wavelength selective films arranged substantially in the shape of an X, and the three optical modulation devices being placed to face three side faces of the prism, the projection display device including a head body having the prism, the three optical modulation devices, and the projection lens mounted thereon, a fan disposed on a side of a prism bearing face of the head body opposite from the prism, and a fan frame attached on the prism bearing face at a plurality of points, wherein the fan frame having a surface that faces the prism bearing face and is shaped substantially in a quadrangle shape, and one of the two diagonal lines passing through opposite corners of the quadrangle extends nearly along a plane that includes the optical axis of the projection lens, the plane being orthogonal to the prism bearing face.

In the present invention described above, the fan frame for holding the fan is mounted along the plane that includes the optical axis of the projection lens and is orthogonal to the prism bearing face. Since the fan frame can be placed close to the projection lens side, it is possible to promote size reduction, and to thereby achieve the above-described object of the present invention.

In the projection display device of the present invention, it is preferable that a the fan frame be mounted on the prism bearing face at corners nearly along the other diagonal line of the quadrangle.

In the present invention described above, it is possible to place the fan closer to the prism and the optical modulation devices, and to thereby improve cooling efficiency.

In the projection display device of the present invention, it is preferable that the fan be placed so that a line linking the center of the prism and the center of the fan be nearly perpendicular to the prism bearing face.

In the present invention described above, the fan is placed directly below the prism. Therefore, it is possible to equitably and efficiently cool the three optical modulation devices arranged around the prism.

In the projection display device of the present invention, it is preferable that the quadrangle of the fan frame be a square, although other quadrangle shapes may also be used. This makes it possible to maximally save space, and to thereby reduce the size of the device.

In the projection display device of the present invention, an outer casing may be provided with a substantially quadrangular fan opening that contains the fan frame.

In the present invention described above, the fan is fixed on the outermost periphery thereof, which secures a sufficient rigidity to fix the fan at two points along the diagonal line.

In this case, it is preferable that the fan be an intake fan, and that the opening be an air inlet.

In the present invention described above, since the optical system is cooled by drawing outside air, sufficient cooling is performed.

Furthermore, in the projection display device of the present invention, it is preferable that the fan be covered with a cover.

In the present invention described above, the cover is provided to cover the intake fan. Even if the hand of an operator is inadvertently put into the intake fan, it is protected by the cover, and therefore, safety is ensured.

DETAILED DESCRIPTION OF PREFERRED EMBODIMENTS

Figure 1:
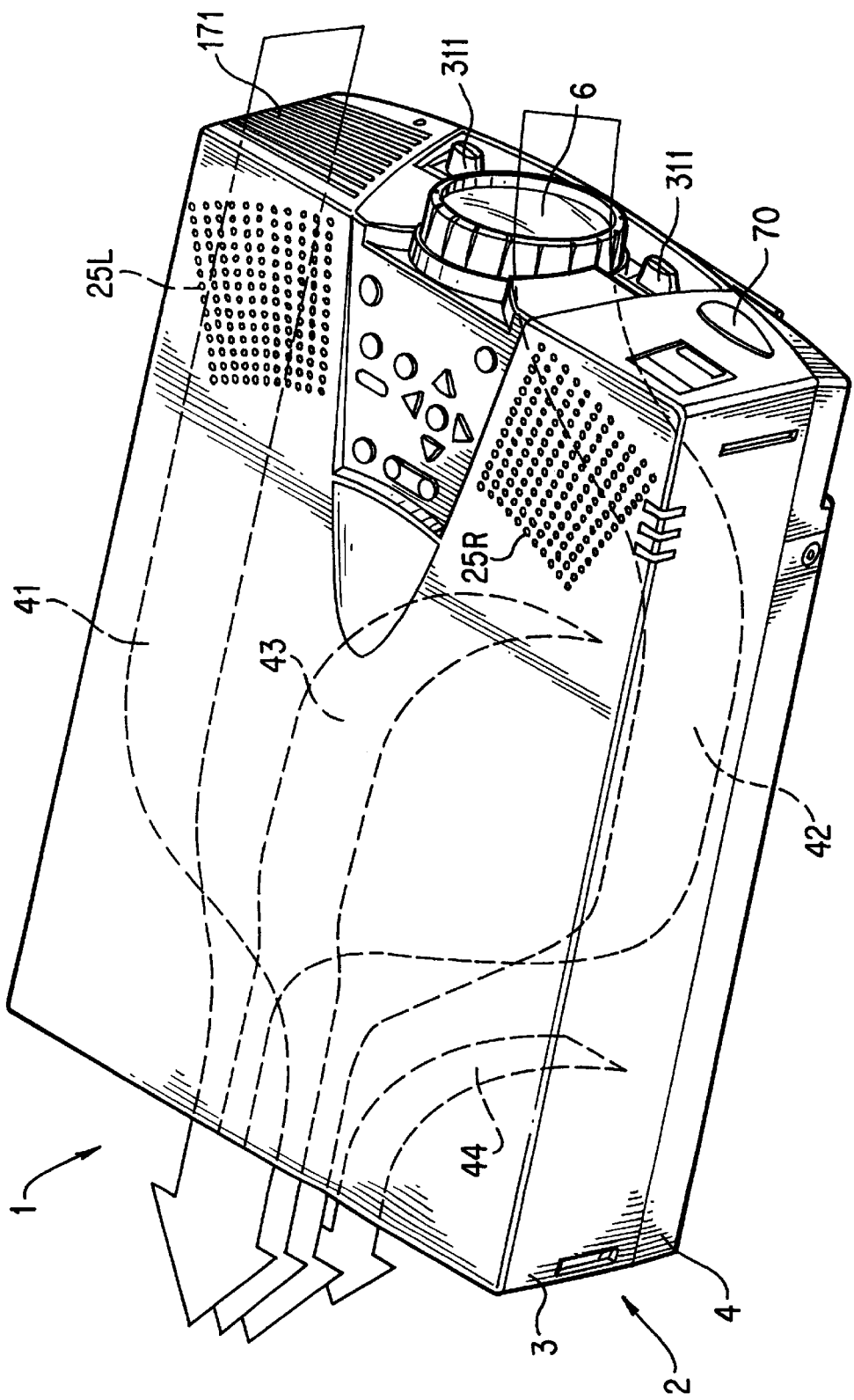
FIG. 1 is an outward perspective view of a projection display device according to an embodiment of the present invention, as viewed from the top side.
Figure 2:
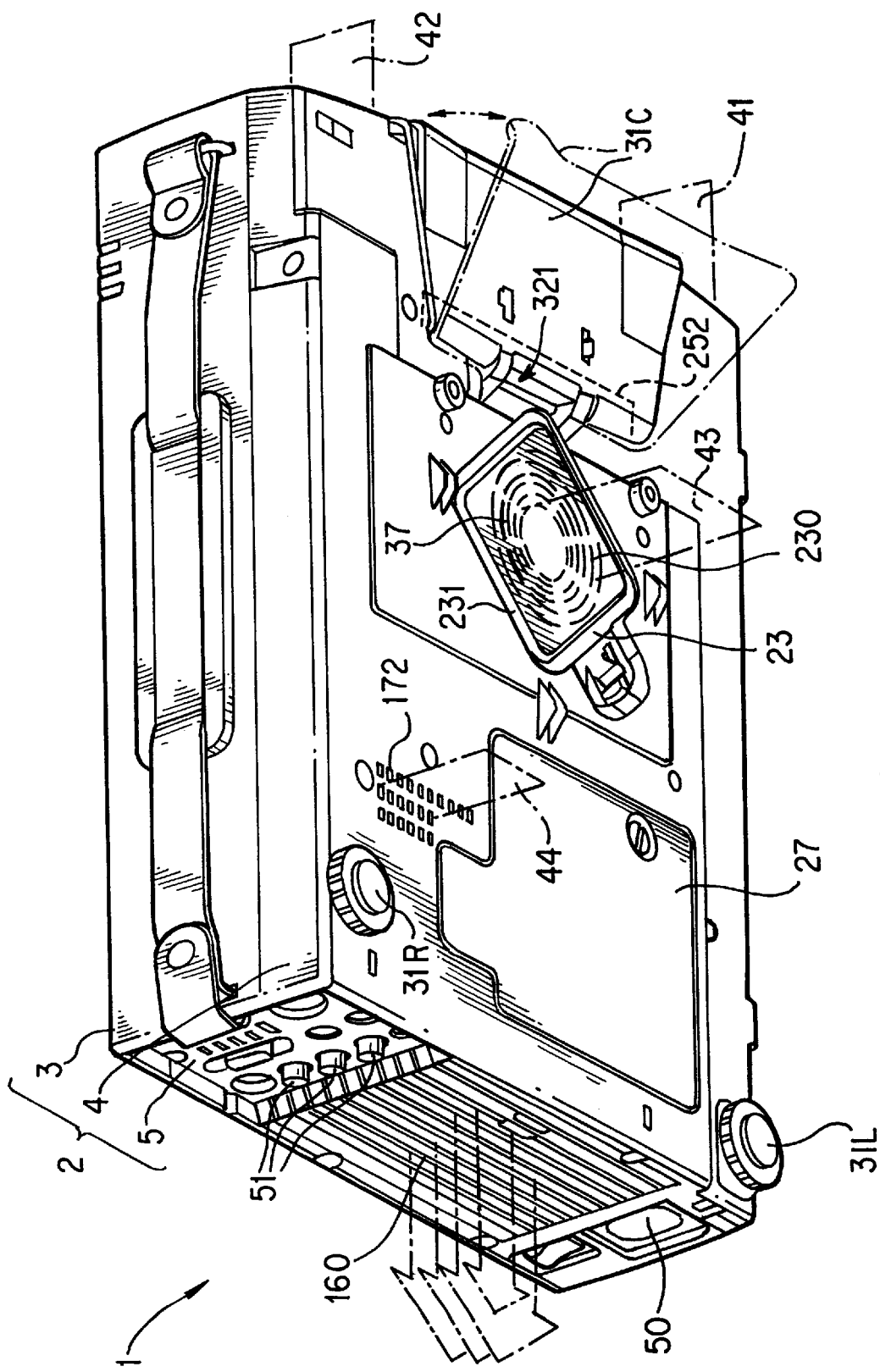
FIG. 2 is an outward perspective view of the projection display device according to an embodiment of the present invention, as viewed from the bottom side.

Embodiments of the present invention will be described below with reference to the drawings.
(1) Overall Configuration of the Device FIGS. 1 and 2 are schematic perspective views of a projection display device 1 according to this embodiment. FIG. 1 is a perspective view, as viewed from the top side, and FIG. 2 is a perspective view, as viewed from the bottom side.

The projection display device 1 is of the type that separates a light beam emitted from a light-source lamp into beams of the three primary colors, red (R), green (G), and blue (B), modulates these color light beams via liquid crystal light valves (optical modulation devices) according to image information, synthesizes the modulated color beams by a prism (color synthesizing optical system), and enlarges and projects the synthesized light beams onto a projection plane via a projection lens 6. The respective components excluding a part of the projection lens 6 are housed inside an outer casing 2.
(2) Structure of Outer Casing The outer casing 2 basically comprises an upper casing 3 for covering the top face of the device, a lower casing 4 for forming the bottom face of the device, and a rear casing 5 (FIG. 2) for covering the rear face.

As shown in FIG. 1, many communication holes 25R and 25L are formed at the right and left front ends of the top face of the upper casing 3. Between these communication holes 25R and 25L, a control switch 60 is disposed to control image quality, and the like of the projection display device 1. Furthermore, a light receiving portion 70 is provided at the left bottom of the front face of the upper casing 3 so as to receive an optical signal from a remote control that is not shown.

As shown in FIG. 2, the bottom face of the lower casing 4 is provided with a lamp replacement cover 27 through which a light-source lamp unit 8 (which will be described later) held inside is replaced, and an air filter cover 23 having an air inlet 230 for cooling the inside of the device.

The bottom face of the lower casing 4 is also provided, as shown in FIG. 2, with a foot 31C at about the front center end, and feet 31R and 31L at the right and left rear corners. The foot 31C is turned via a turning mechanism 312 (FIG. 2) disposed on its rear side by raising levers 311 shown in FIG. 1, and is urged into an open state in which it is separated on its front side from the main body of the device, as shown by a double-dotted chain line in FIG. 2. By controlling the amount of turn, the vertical position of a display screen on the projection plane can be changed. In contrast, the feet 31R and 31L are extended or retracted in the projecting direction by being turned. By controlling the amount of extension or retraction, the inclination of the display screen can be changed.

Figure 3:
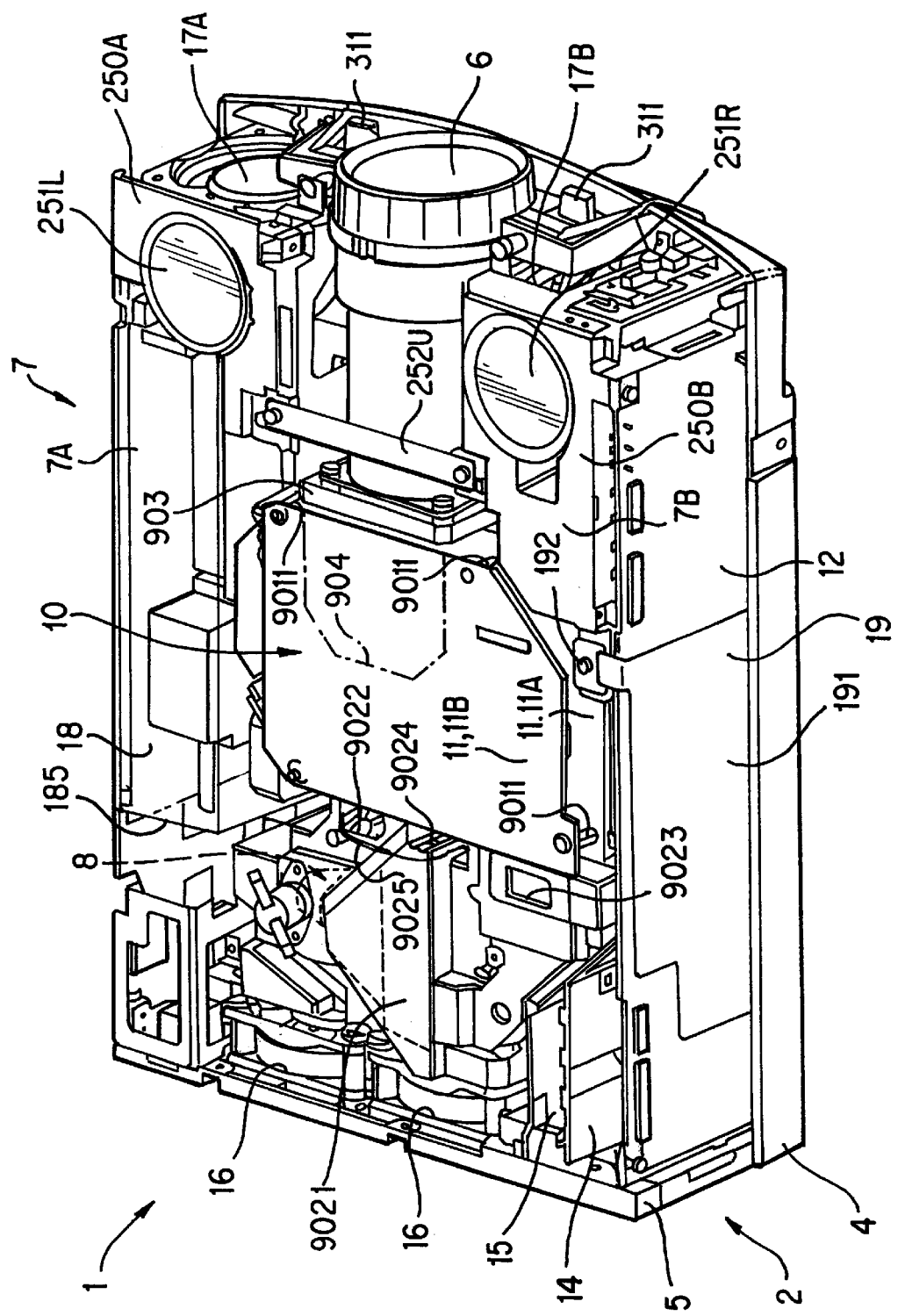
FIG. 3 is a perspective view showing the internal configuration of the projection display device of an embodiment of the present invention.
Figure 4:
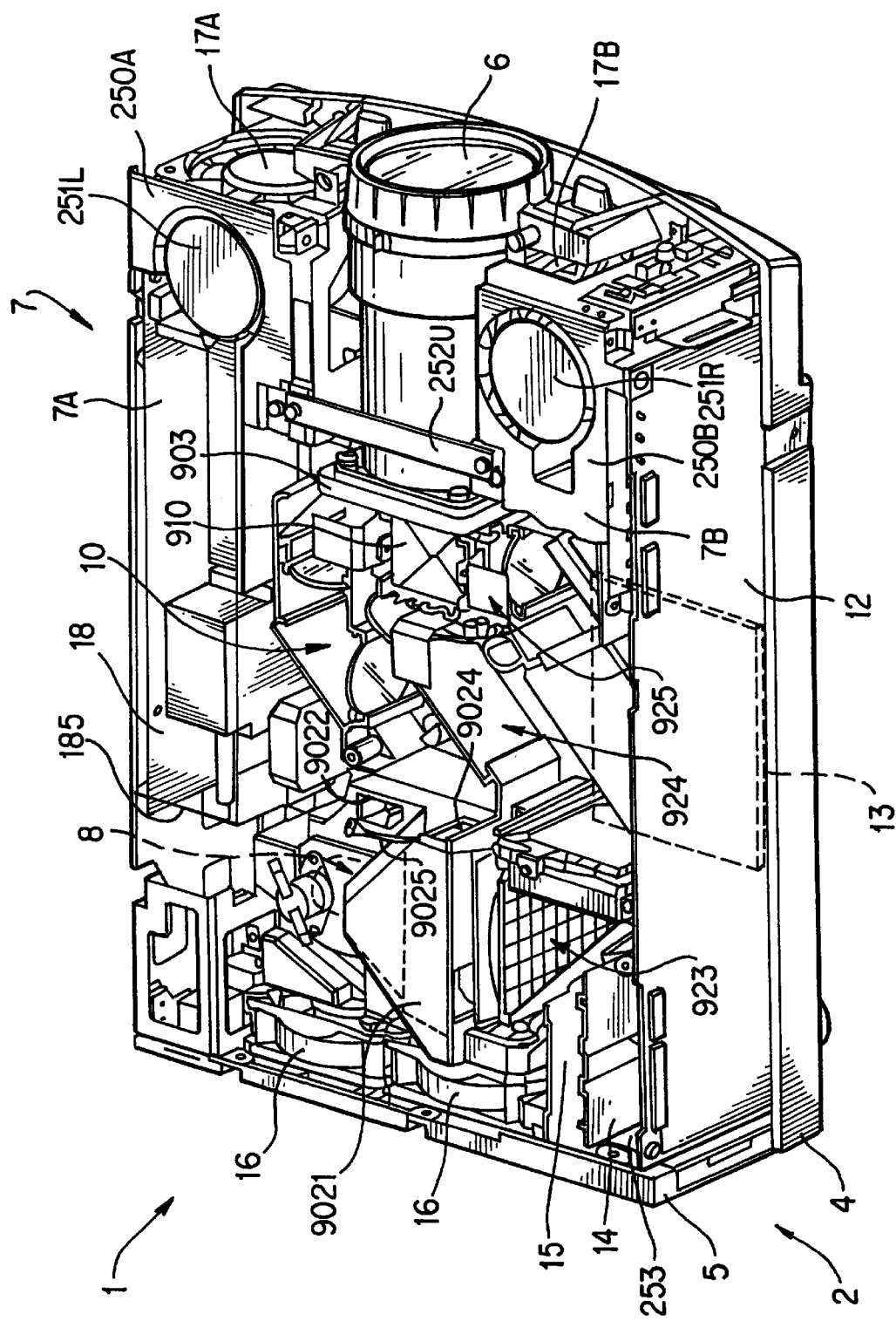
FIG. 4 is a perspective view of an optical system inside the projection display device of an embodiment of the present invention.
Figure 5:
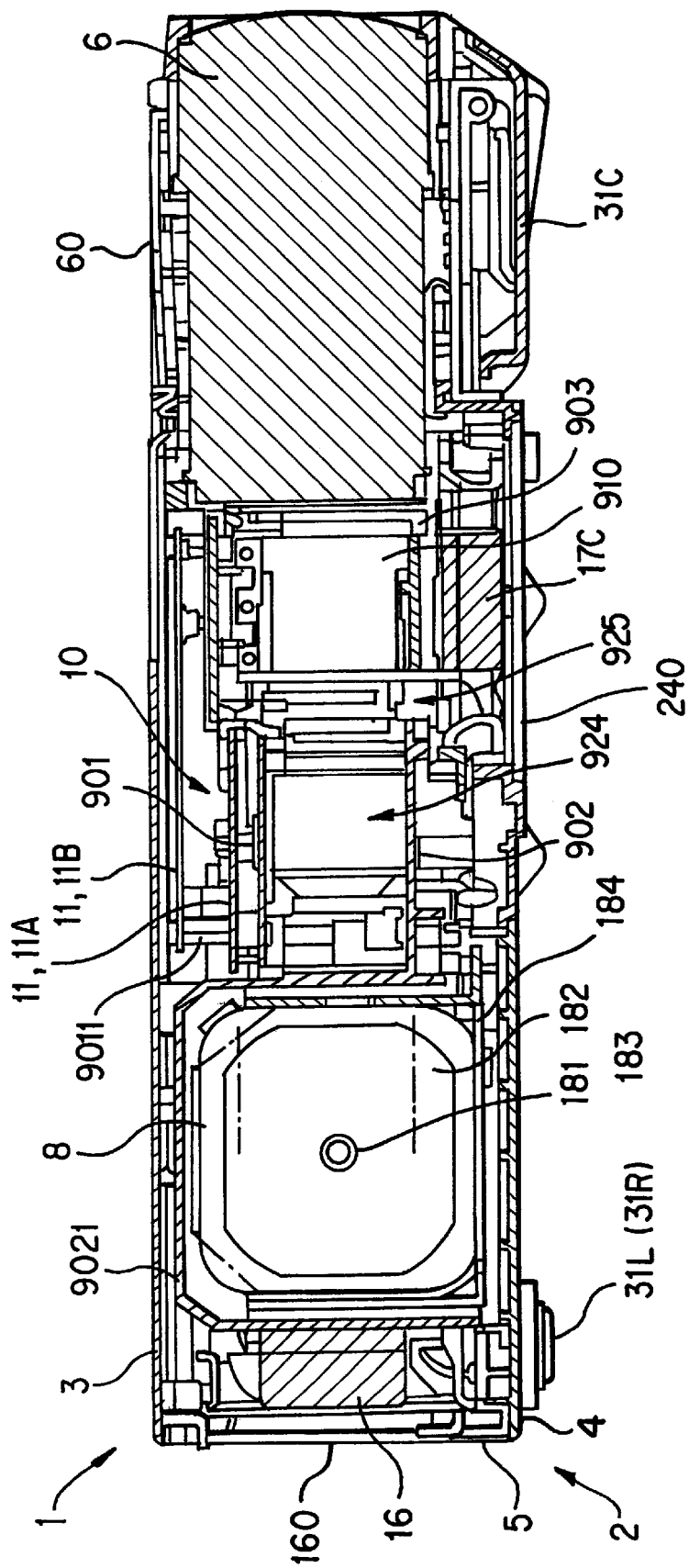
FIG. 5 is a vertical sectional view showing the internal configuration of the projection display device of an embodiment of the present invention.

In the rear casing 5, as shown in FIG. 2, an AC inlet 50 for external power supply, and a group of various kinds of input-output terminals 51 are arranged. An air outlet 160 is formed adjacent to these input-output terminals 51 so as to exhaust air inside the device therethrough.
(3) Inner Configuration of the Device FIGS. 3 to 5 show the inner configuration of the projection display device 1. FIGS. 3 and 4 are schematic perspective views showing the inside of the device, and FIG. 5 is a vertical sectional view of the projection display device 1.

As these figures show, a power supply unit 7 serving as a power supply, the light-source lamp unit 8, an optical unit 10 forming an optical system, a pair of upper and lower driver boards 11 serving as optical modulation device driving substrates, a main board 12 serving as a control circuit substrate, and the like are arranged inside the outer casing 2.

The power supply unit 7 is composed of first and second power supply blocks 7A and 7B disposed on both sides of the projection lens 6. The first power supply block 7A transforms electric power obtained via the AC inlet 50, and mainly supplies the power to the second power supply block 7B and the light-source lamp unit 8. The first power supply block 7A comprises a power-supply circuit substrate on which a transformer, a rectifier circuit, a smoothing circuit, a voltage stabilizing circuit, and the like are formed, and a lamp driving substrate 18 for driving a light-source lamp 1181 (FIG. 5) in the light-source lamp unit 8, which will be described later. The lamp driving substrate 18 is covered with a transparent resin cover 185. The second power supply block 7B further transforms and supplies the electric power obtained from the first power supply block 7B, and comprises a power-supply circuit substrate on which a transformer and various circuits are formed, in a manner similar to the first power supply block 7A. The electric power is supplied to another power-supply circuit substrate 13 disposed below the optical unit 10 (shown by a dotted line in FIG. 4), and first and second intake fans 17A and 17B placed adjacent to the power supply blocks 7A and 7B. A power-supply circuit on the power-supply circuit substrate 13 mainly generates electric power for driving a control circuit on the main board 12 based on the electric power from the second power supply block 7B, and also generates electric power for other low-power components. The second intake fan 17B is disposed between the second power supply block 7B and the projection lens 6 so as to draw cooling air from the outside into the inside through a clearance formed between the projection lens 6 and the upper casing 3 (FIG. 1). The power supply blocks 7A and 7B include conductive cover members 250A and 250B made of aluminum or the like, respectively. The respective cover members 250A and 250B are provided with speakers 251R and 251L for voice output at the positions corresponding to the communication holes 25R and 25L formed through the upper casing 3. These cover members 250A and 25013 are mechanically and electrically connected at the top by a conductive metal plate 252U, as shown in FIG. 3, are electrically connected at the bottom by a metal plate 252L (shown by a dotted line in FIG. 2), and are finally grounded via a GND (ground) line of the inlet 50. Of these metal plates 252U and 252L, the metal plate 252L is previously fixed to the lower casing 4 made of resin, and both ends thereof are brought into contact with the lower surfaces of the cover members 250A and 250B to establish continuity therebetween, by assembling the power supply blocks 7A and 7B and the lower casing 4.

The light-source lamp unit 8 constitutes a light-source section of the projection display device 1, and comprises a light-source device 183 including a light-source lamp 181 and a reflector 182, and a lamp housing 184 for housing the light-source device 183. Such a light-source lamp unit 8 is covered with a housing portion 9021 that is formed integrally with a lower light guide 902 (FIG. 5), and is structured so that it can be detached through the above-described lamp replacement cover 27. In the rear of the housing portion 9021, a pair of exhaust fans 16 are arranged on the right and left sides at the positions corresponding to the air outlet 160 of the rear casing 5. Although described in detail later, the exhaust fans 16 lead cooling air drawn by the first to third intake fans 17A to 17C into the housing portion 9021 from an opening formed adjacent thereto, cool the light-source lamp unit 8 by this cooling air, and then exhaust the cooling air from the air outlet 160. Electric power is supplied to the exhaust fans 16 from the power-supply circuit substrate 13.

The optical unit 10 is a unit that forms an optical image corresponding to image information by optically processing a light beam emitted from the light-source lamp unit 8, and comprises an illumination optical system 923, a color separation optical system 924, an optical modulation device 925, and a prism unit 910 serving as a color synthesizing optical system. The optical elements in the optical unit 10 other than the optical modulation device 925 and the prism unit 910 are vertically held between upper and lower light guides 901 and 902 that are integrally formed and are fixed to the lower casing 4 by fixing screws.

Figure 6:
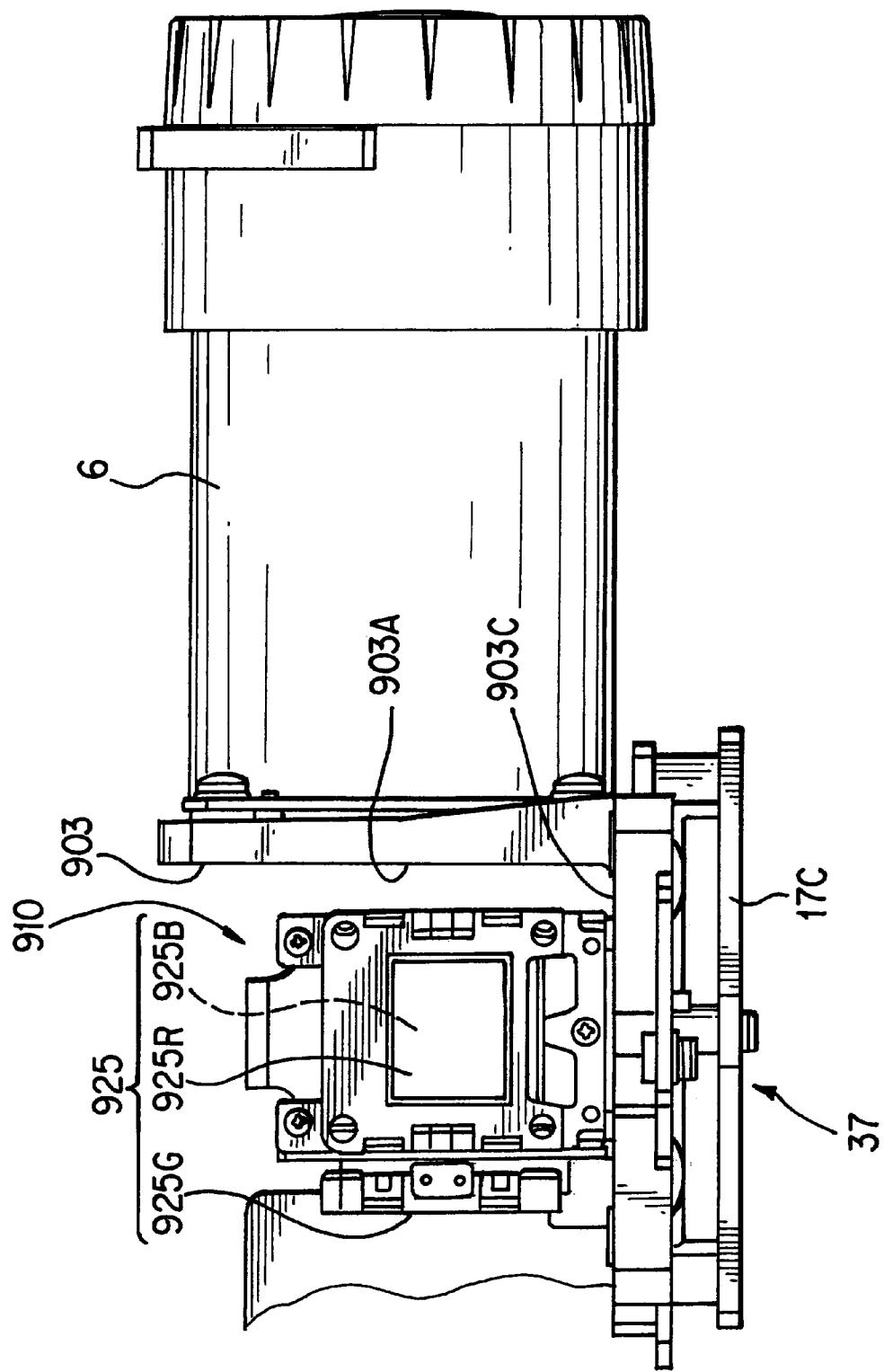
FIG. 6 is a vertical sectional view of a structure according to an embodiment of the present invention in which an optical modulation device, a color synthesizing optical system, and a projection lens are mounted.

The prism unit 910 shaped like a rectangular parallelepiped is fixed by fixing screws to a prism bearing face 903C of a head body 903 that is a structure formed of an integrally molded piece of magnesium and having a nearly L-shaped profile, as shown in FIG. 6. Respective liquid crystal light valves 925R, 925G, and 925B, which serve as optical modulation devices for constituting the optical modulation device 925 are placed to face three side faces of the prism unit 910, and are similarly fixed to the head body 903 via a fixing plate (not shown). The liquid crystal light valve 925B is positioned to be opposed to the liquid crystal light valve 925R across the prism unit 910 (FIG. 9), and only a leader line (dotted line) and a reference numeral thereof are shown in FIG. 6. The liquid crystal light valves 925R, 925G, and 925B are cooled by cooling air from a third intake fan 17C that is placed on the opposite side of the prism bearing face 903C of the head body 903 from the prism unit 910 corresponding to the above-described air inlet 1230. In this case, electric power for the third intake fan 17C is supplied from the power-supply circuit substrate 13 via the driver board 11. Furthermore, the base end of the projection lens 6 is similarly fixed to the front face of the head body 903 by fixing screws. The head body 903, which is thus equipped with the prism unit 910, the optical modulation device 925, and the projection lens 6, is fixed to the lower light guide 902 by fixing screws, as shown in FIG. 5.

The driver boards 11 serve to drive and control the respective liquid crystal light valves 925R, 925G, and 925B in the optical modulation device 925 described above, and are disposed above the optical unit 10. A lower driver board 11A and an upper driver board 11B are separated from each other via a stud bolt 9011, and have many elements, which are not shown, for constituting a driver circuit and the like, mounted on the opposing surfaces thereof. That is, most of the elements are efficiently cooled by cooling air that flows between the respective driver boards 11. Such cooling air is mainly drawn in by the above-described third intake fan 17C, cools the respective liquid crystal light valves 925R. 925G, and 925B, and then flows between the respective driver boards 11 through an opening 904 (shown by a double-dotted chain line in FIG. 3) of the upper light guide 901.

The main board 12 is provided with a control circuit for controlling the entire projection display device 1, and stands on the side of the optical unit 10. Such a main board 12 is electrically connected to the driver boards 11 and the control switch 60 described above, is electrically connected to an interface substrate 14 having the group of input-output terminals 51, and a video substrate 15, and is further connected to the power-supply circuit substrate 13 via a connector or the like. The control circuit of the main board 12 is driven by electric power generated by the power-supply circuit on the power-supply circuit substrate 13, that is, electric power from the second power supply block 7B. The main board 12 is cooled by cooling air that flows from the second intake fan 17B and passes through the second power supply block 7B.

In FIG. 3, a guard member 19 made of metal, such as aluminum, is interposed between the main board 12 and the outer casing 2 (only the lower casing 4 and the rear casing 5 are shown in FIG. 3). The guard member 19 has a large planar portion 191 that spreads between the top and bottom ends of the main board 12, is fixed at the top to the cover member 250B of the second power supply block 7A by a fixing screw 192, and is engaged with and supported by, for example, a slit in the lower casing 4 at the bottom. As a result, the upper casing 3 (FIG. 1) and the main board 12 are prevented from interfering with each other in combining the upper casing 3 with the lower casing 4, and the main board 12 is protected from external noise.

(4) Configuration of Optical System

Figure 9:
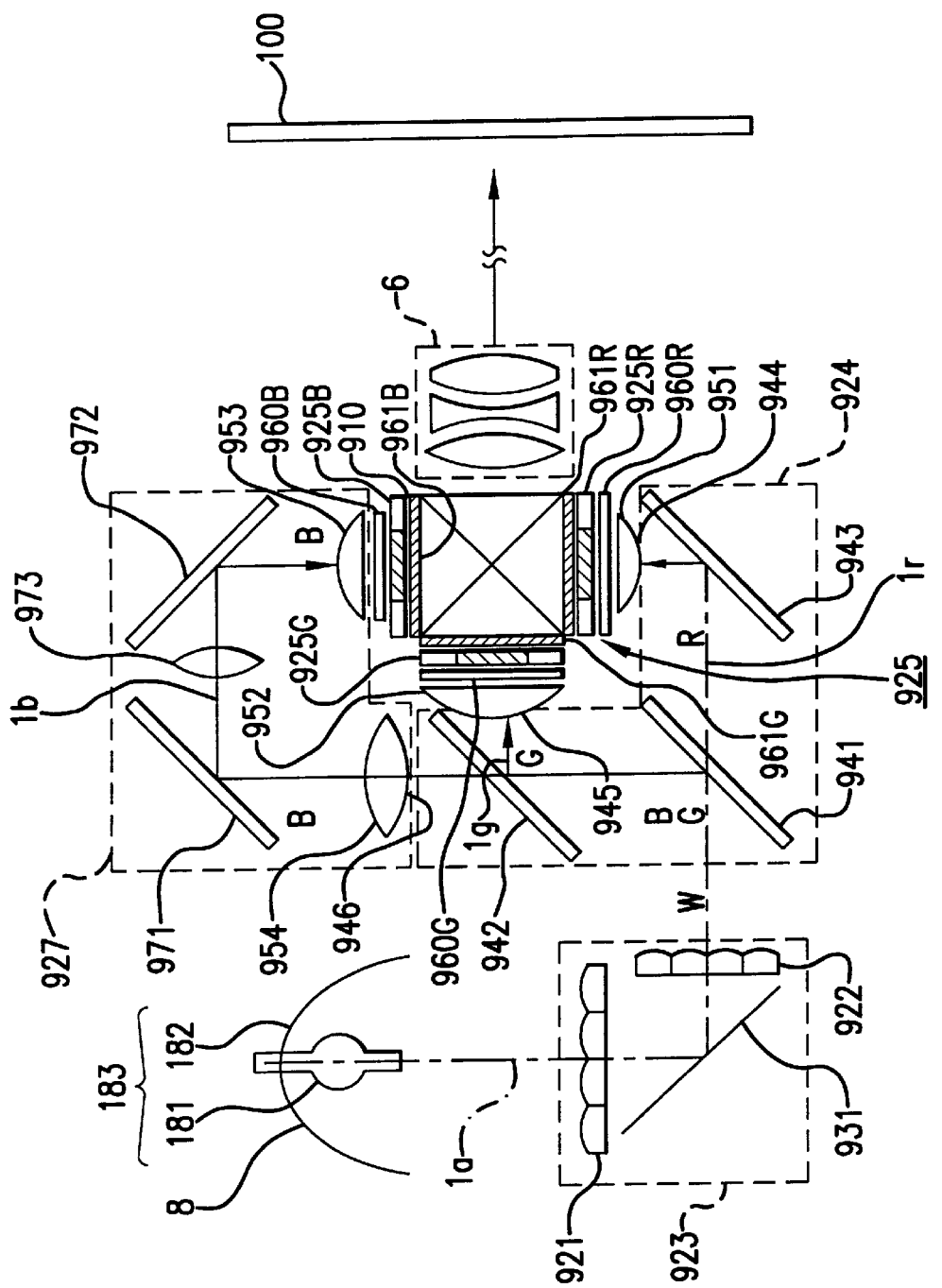
FIG. 9 is a schematic view illustrating the configuration of the optical system in the projection display device of an embodiment of the present invention.

Next, the configuration of the optical system in the projection display device 1, that is, the optical unit 10, will be described with reference to FIG. 9 as a schematic view.

As described above, the optical unit 10 comprises the illumination optical system 923 for making uniform the in-plane illumination distribution of a light beam (W) from the light-source lamp unit 8, the color separation optical system 924 for separating the light beam (W) from the illumination optical system 923 into red (R), green (G), and blue (B) beams, the optical modulation devices 925 for modulating the respective color beams R, G, and B according to image information, and the prism unit 910 that serves as the color synthesizing optical system for synthesizing the respective modulated color beams.

The illumination optical system 923 includes a reflecting mirror 931 for bending an optical axis 1a of the light beam W emitted from the light-source lamp unit 8 toward the front of the device, and a first lens plate 921 and a second lens plate 922 disposed on both sides of the reflecting mirror 931.

The first lens plate 921 includes a plurality of rectangular lenses arranged in a matrix form, and splits the light beam emitted from the light source into a plurality of partial beams, and collects the respective partial beams near the second lens plate 922.

The second lens plate 922 includes a plurality of rectangular lenses arranged in a matrix form, and has the function of superimposing the respective partial beams emitted from the first lens plate 921 onto the liquid crystal light valves 925R, 925G, and 925B (which will be described later) for constituting the optical modulation device 925.

In this way, since the liquid crystal light valves 925R, 925G, and 925B can be illuminated with light having substantially uniform illuminance by the illumination optical system 923 in the projection display device 1 of this embodiment, it is possible to achieve a projection image having uniform illuminance.

The color separation system 924 includes a blue and green reflecting dichroic mirror 941, a green reflecting dichroic mirror 942, and a reflecting mirror 943. First, a blue beam B and a green beam G contained in the light beam W emitted from the illumination optical system 923 are perpendicularly reflected by the blue and green reflecting dichroic mirror 941, and travel toward the green reflecting dichroic mirror 942.

A red beam R passes through the blue and green reflecting dichroic mirror 941, is perpendicularly reflected by the reflecting mirror 943 disposed at the rear thereof, and emerges from an emergent portion 944 for the red beam R toward the prism unit 910. Next, only the green beam G of the blue and green beams B and G reflected by the blue and green reflecting dichroic mirror 941 is perpendicularly reflected by the green reflecting dichroic mirror 942, and emerges from an emergent portion 945 for the green beam G toward the prism unit 910. The blue beam B passed through the green reflecting dichroic mirror 942 emerges from an emergent portion 946 for the blue beam B toward a light guide system 927. In this embodiment, the distances from an emergent portion of the illumination optical system 923 for the light beam W to the emergent portions 944, 945, and 946 of the color separation optical system 924 for the respective color beams R, G, and B are set to be equal.

On the emergent sides of the emergent portions 944 and 945 of the color separation optical system 924 for the red and green beams R and G, condenser lenses 951 and 952 are disposed, respectively. Therefore, the red and green beams R and G emitted from the respective emergent portions enter these condenser lenses 951 and 952, where they are collimated.

The red and green beams R and G thus collimated pass through incident-side polarizers 960R and 960G, and enter the liquid crystal light valves 925R and 925G, where they are modulated and given image information corresponding to the respective color beams. That is, these liquid crystal light valves 925R and 925G are subjected to switching control according to image information by the above-described driver boards 11, thereby modulating the respective color beams passing therethrough. In contrast, the blue beam B is guided to the corresponding liquid crystal light valve 925B via the light guide system 927, where it is similarly subjected to modulation according to image information. As the liquid crystal light valves 925R, 925G, and 925B of this embodiment, for example, liquid crystal light valves may be adopted that use polysilicon TFTs as switching elements.

The light guide system 927 comprises a condenser lens 954 disposed on the emergent side of the emergent portion 946 for the blue beam B, an incident-side reflecting mirror 971, an emergent-side reflecting mirror 972, an intermediate lens 973 interposed between these reflecting mirrors, and a condenser lens 953 disposed before the liquid crystal light valve 925B. The blue beam B emerging from the condenser lens 953 passes through an incident-side polarizer 960B, and enters the liquid crystal light valve 925B, where it undergoes modulation. In this case, the optical axis 1a of the light beam W and the optical axes 1r, 1g, and 1b of the respective color beams R, G, and B are formed in the same plane. The blue beam B has the longest one of the optical path lengths of the respective color beams, namely, the distances from the light-source lamp 181 to the respective liquid crystal panels. Therefore, this light beam undergoes the largest light loss. The light loss can, however, be reduced by interposing the light guide system 927.

Next, the respective color beams R, G, and B modulated through the respective liquid crystal light valves 925R, 925G, and 925B pass through emergent-side polarizers 961R, 961G, and 961B, and enter the prism unit 910, where they are synthesized. That is, the prism unit 910 has a prism including two types of wavelength selective films arranged nearly in the shape of an X therein. The respective color beams R, G, and B are synthesized because of selecting characteristics of the two types of wavelength selective films. A color image formed by synthesis by the prism unit 910 is enlarged and projected via the projection lens 6 onto a projection plane 100 that is disposed at a predetermined position.

(5) Description of Cooling Flow Paths

Next, a description will be given of cooling flow paths formed in the projection display device 1.

In the projection display device 1, as is schematically shown by the arrows in FIGS. 1 and 2, there are mainly formed a first power supply block cooling flow path 41, a second power supply block cooling flow path 42, an optical modulation device cooling flow path 43, and a light source cooling flow path 44. However, cooling air circulating through the cooling flow paths 41 to 44 does not exactly flow along the arrows in the figures, and is drawn and exhausted nearly along the arrows through the spaces between the respective components.

The first power supply block cooling flow path 41 is a path for cooling air that is drawn from an air inlet 171 by the first intake fan 17A (FIGS. 3 and 4). The cooling air cools the first power supply block 7A, and then cools the lamp driving substrate 18 disposed at the rear thereof In this case, the cooling air flows inside the resin cover 185 that is open at both front and rear ends, and the direction of the flow is thereby limited to one direction, which can reliably maintain a sufficient flow rate to cool the lamp driving substrate 18. After that, the cooling air flows into the housing portion 9021 from an opening 9022 formed at the top thereof, or another opening or space that is not shown, cools the light-source lamp unit 8 (light-source lamp 181) disposed therein, and is exhausted from the air outlet 160 by the exhaust fans 16.

The second power supply block cooling flow path 42 is a path for cooling air that is drawn by the second intake fan 17B. The cooling air cools the second power supply block 7B, and then cools the main board 12 disposed at the rear thereof. Furthermore, the cooling air flows into the housing portion 9021 from an opening 9023 adjacent thereto or the like, cools the light-source lamp unit 8, and is exhausted from the air outlet 160 by the exhaust fans 16.

The optical modulation device cooling flow path 43 is a path for cooling air that is drawn in by the third intake fan 17C shown in FIGS. 5 and 6. As described above, the cooling air cools the respective liquid crystal light valves 925R, 925G, and 925B, flows between the upper and lower driver boards 11A and 11B through the opening 904 of the upper light guide 901 disposed directly above, and flows to the rear side along the opposing surfaces of the respective driver boards 11A and 11B. That is, the respective driver boards 11A and 11B form a part of the optical modulation device cooling flow path 43, and the elements mounted on the opposing surfaces thereof, which face the optical modulation device cooling flow path 43, are thereby efficiently cooled. The cooling air flows in the housing portion 9021 through another opening 9024 as well as the above-described openings 9022 and 9023 to cool the light-source lamp unit 8, and is similarly exhausted from the air outlet 160.

Figure 7:
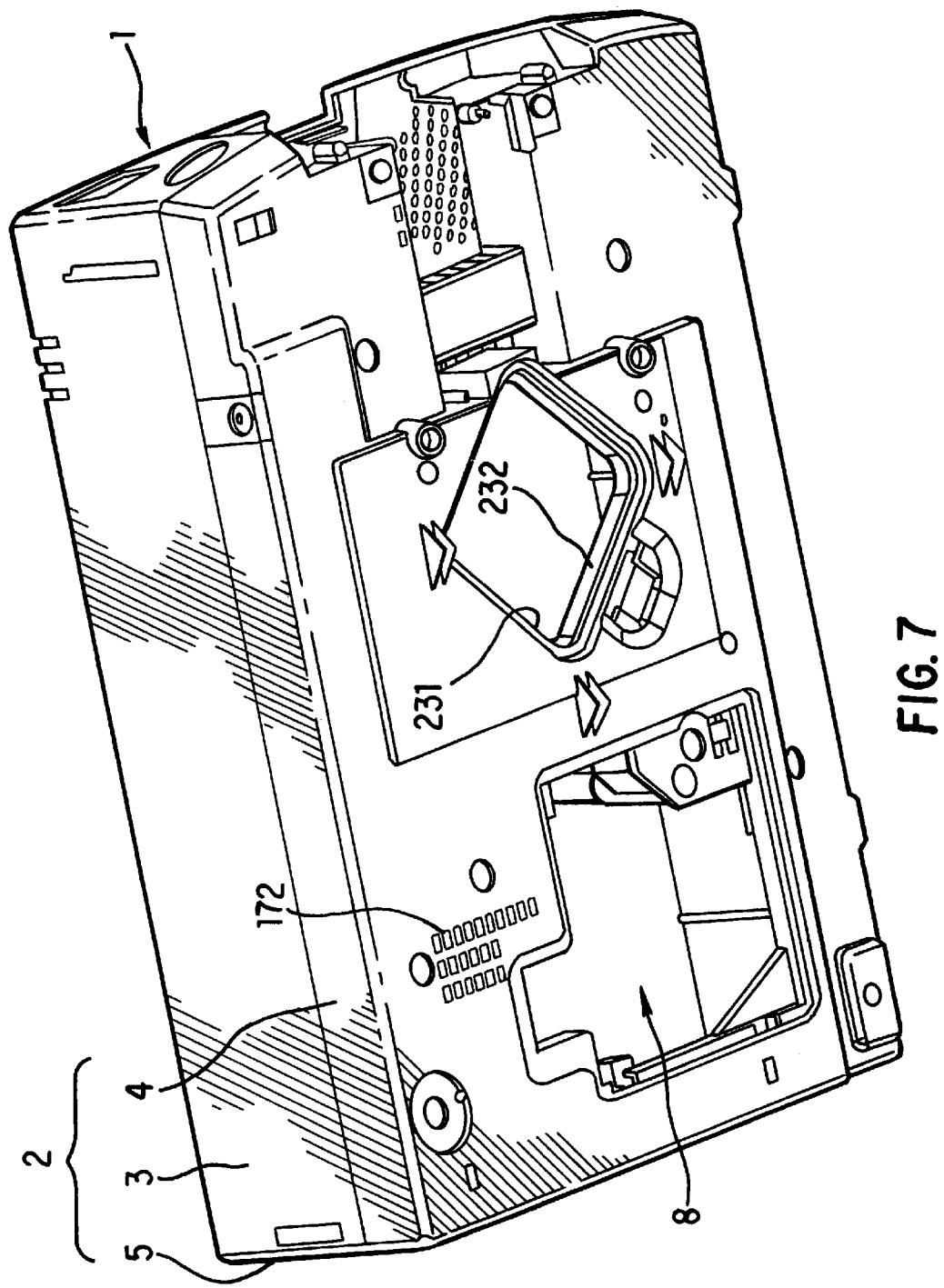
FIG. 7 is an outward perspective view of the projection display device of an embodiment of the present invention, as viewed from the bottom side.
Figure 8:
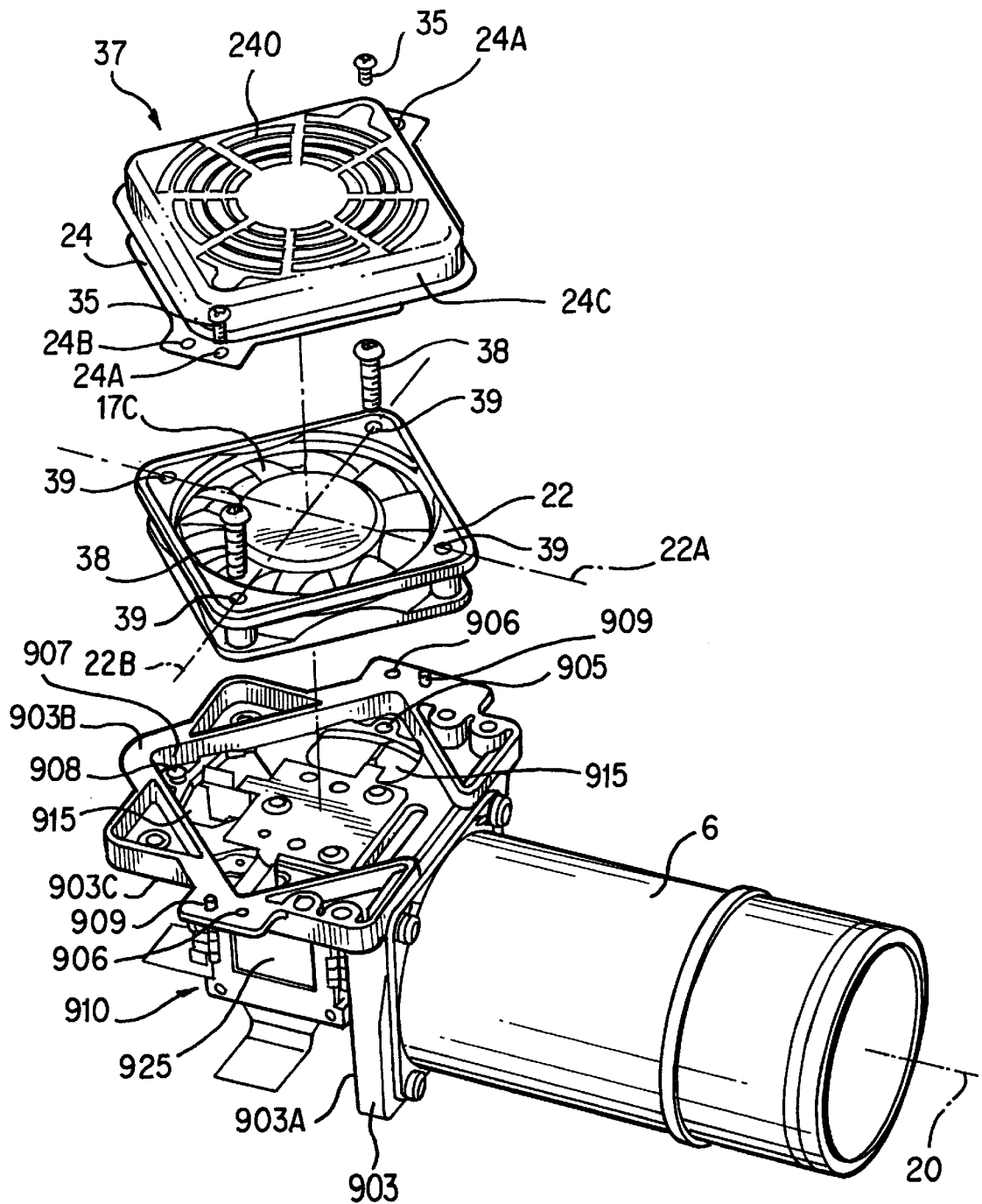
FIG. 8 is an exploded perspective view of a fan section for cooling the optical system in the projection display device of an embodiment of the present invention.

The structure of an intake section 37, which serves as a starting point of the optical modulation device cooling flow path 43, is shown in FIGS. 2, 7, and 8. That is, the lower casing 4 has an opening 231, and a fan frame 22 for holding the opening 231 and the intake fan 17C, and a fan cover 24 are disposed at the corresponding position inside the outer casing 2. The opening 231 is formed so that one diagonal line thereof is placed on an optical axis 20 of the projection lens 6, as viewed from directly below the device. Moreover, the opening 231 is covered with an air filter cover 23 (FIG. 2) that is detachable from the device from the outside. The air filter cover 23 has, on the inner side of the device, a thin ventilative air filter (not shown) so as to prevent dirt, dust, and the like from entering the inside of the device. A rib 232 is formed on the inner side of the opening 231.

The fan frame 22 that holds the intake fan 17C is fitted in a recess 907 formed on a surface (back surface) 903B of the prism bearing face 903C opposite from the prism unit 910, while holding the intake fan 17C.

The fan frame 22 is a frame whose surface facing the prism bearing face 903C is substantially square in outline. The fan frame 22 is disposed so that one of the two diagonal lines 22A of the square is placed nearly on the optical axis 20 of the projection lens, as viewed from directly below the device, that is, so that one diagonal line 22A including the optical axis 20 of the projection lens and is substantially follows the plane that is orthogonal to the prism bearing face. Mounting holes 39 and 39 are formed at four corners of the fan frame 22.

On the other hand, screw holes 905 and 905 are formed at the positions in the recess 907 of the head body 903 nearly along the other diagonal line 22B of the fan frame 22. A projection 908 is formed at the position nearly along the diagonal line 22A of the fan frame 22.

The fan frame 22 is attached on the back face 903B of the head body 903 by fitting screws 38 and 38 in two of the four mounting holes 39, and inserting the screws 38 and 38 into the screw holes 905 and 905 formed in the recess 907 of the head body 903. That is, the portion of the fan frame 22 nearly along the diagonal line 22B is attached to the prism bearing face 903C. One of the two remaining mounting holes 39 of the fan frame 22 is engaged with the projection 908, thereby preventing the fan frame 22 from being displaced.

The mounting holes 39 are formed at four corners of the fan frame 22, and any of the mounting screws 39 can be used in mounting the fan frame 22. This improves efficiency in the mounting operation.

As shown in FIG. 8, three air inlets 915 are formed in the prism bearing face 903C of the head body 903 so as to guide cooling air drawn by the intake fan 17C upward, that is, toward the respective liquid crystal light valves 925R, 925G, and 925B. These air inlets 915 are positioned corresponding to the respective liquid crystal light valves 925R, 925G, and 925B.

The head body 903 is provided with the above-described fan cover 24 so as to cover the fan frame 22. The fan cover 24 has a web-like opening 240 on its surface, in a manner similar to the air filter cover 23 shown in FIG. 2, and air is drawn from this opening 240. Two cover screw holes 906 are formed on the outer side of the recess 907 of the head body 903, and at substantially symmetrical positions with respect to the diagonal line 22A. On the other hand, at two corners of the fan cover 24, mounting holes 24A are formed corresponding to the screw holes 906. Cover mounting screws 35 are inserted in the mounting holes 24A, and are screwed into the screw holes 906 of the head body 903, thereby mounting the fan cover 24 on the head body 903. Projections 909 are formed adjacent to the screw holes 906 of the head body 903. In contrast, engaging holes 24B are formed adjacent to the mounting holes 24A of the fan cover 24. The projections 909 and the engaging holes 24B are engaged with each other in order to prevent the fan cover 24 from being displaced.

As described above, when the fan frame 22 for holding the intake fan 17C on the back surface 903B of the head body 903, and the fan cover 24 are placed in combination inside the lower casing 4, an edge 24C of the fan cover 24 is clamped between the rib 232 formed at the opening 231 in the lower casing 4, and the wall of the recess 907 of the head body 903. That is, the opening 231 and the recess 907 are connected, which makes it possible to prevent dirt, dust, or the like from entering from the gap between the opening 231 and the recess 907.

The light source cooling flow path 44 is a path for cooling air drawn in from an air inlet 172 (FIG. 2) on the lower surface of the lower casing 4. The cooling air is drawn in by the exhaust fans 16. After being drawn in from the air inlet 172, the cooling air flows in the housing portion 9021 from an opening or space formed in the lower surface thereof to cool the light-source lamp unit 8, and is exhausted from the air outlet 160.

The cooling air through the above-described cooling flow paths 41 to 44 is exhausted from the air outlet 160 by the respective exhaust fans 16. These exhaust fans 16 are controlled according to the temperatures of heated components. Briefly, a temperature sensor 9025 covered with a shrink tube or the like is provided adjacent to the opening 9022 on the side of the light-source lamp unit 8 that is apt to increase in temperature, and similar temperature sensors (not shown) are also provided adjacent to the second lens plate 922 below the opening 9023 (FIG. 4), and adjacent to the first and second power supply blocks 7A and 7B, and the liquid crystal light valves 925R, 925G, and 925B. Electrical signals from these temperature sensors 9025 in the respective cooling flow paths 41 to 44 are, for example, output to the main board 12 via the power-supply circuit substrate 13 or the like. The main board 12 detects the temperature of the heated components or the cooling air by electrically processing these signals. As a result, the main board 12 executes control so as to perform positive cooling by simultaneously driving the exhaust fans 16 when it is determined that the temperature is too high, or to save electric power by driving only one of the exhaust fans 16.

(6) Advantages of the Embodiment

The above-described embodiment provides the following advantages.

1) The fan frame 22 is mounted nearly along the diagonal line 22B orthogonal to the diagonal line 22A that is coaxial with the optical axis 20 of the lens 6. Since the diagonal line 22B can be placed close to the lens 6, the intake fan 17C can also be placed close to the projection lens side, which promotes size reduction.

2) Since the fan frame 22 in the intake section 37 is mounted on the prism bearing face 903C nearly along the diagonal line 22B, the intake fan 17C can be mounted close to the prism unit 910 and the liquid crystal light valves 925R, 925G, and 925B. Therefore, it is possible to make the size smaller than in a case when the fan frame 22 is fixed at four corners, and to thereby improve cooling efficiency.

3) The center of the intake fan 17C can be aligned with the midpoint among the respective liquid crystal light valves 925R, 925G, and 925B, and this makes it possible to equitably and efficiently cool the respective liquid crystal light valves 925R, 925G, and 925B.

4) Since the fan cover 24 is provided to cover the intake fan 17C, even if the hand of an operator is inadvertently placed into the intake section 37, it is safely protected by the cover 24.

5) The air inlet 230 on the surface of the air filter cover 23 and the air inlet 240 on the surface of the fan cover 24 have a web-like shape, and a sponge or the like which can ventilate air is bonded to the inner side of the air filter cover 23. Therefore, sufficient air can be drawn in, while removing dirt and the like, which improves cooling efficiency.

6) In the projection display device 1, the power supply unit 7 that is relatively large among the components is composed of smaller first and second power supply blocks 7A and 7B, which are placed separately from each other. By efficiently placing the power supply blocks 7A and 7B inside the device 1, little dead space is formed inside the device 1, which allows size reduction of the device 1.

7) Although the first and second power supply blocks 7A and 7B, and the liquid crystal light valves 925R, 925G, and 925B are more apt to generate heat than other components, they can be satisfactorily cooled even when the components are densely placed in the device 1 because the first and second power supply block cooling flow paths 41 and 42 are provided for the first and second power supply blocks 7A and 7B that are apt to generate heat, and the optical modulation device cooling flow path 43 is also provided for the liquid crystal light valves 925R, 925G, and 925B. This can improve the cooling efficiency in the overall device 1.

8) While cooling air can be caused to flow through the respective cooling flow paths 41 to 43, for example, by driving only the respective exhaust fans 16, since the intake fans 17A to 17C are provided for the cooling flow paths 41 to 43, respectively, in this embodiment, it is possible to draw and pass a sufficient amount of cooling air into the respective cooling flow paths 41 to 43, and to thereby achieve reliable cooling.

9) On the rear side of the device 1, the respective power supply block cooling flow paths 41 and 42 and the optical modulation device cooling flow path 43 are formed to pass through the light-source lamp unit 8 (light-source lamp 181). Therefore, it is possible to more efficiently cool the light-source lamp unit 8, which is most apt to be heated to a high temperature, compared with a case in which only the light source cooling flow path 44 is provided.

10) The lamp driving substrate 18 for driving the light-source lamp 181 is placed in the first power supply block cooling flow path 41, the main board 12 for controlling the overall device 1 is placed in the second power supply block cooling flow path 42, and the driver board 11 for driving the liquid crystal light valves 925R, 925G, and 925B is placed in the optical modulation device cooling flow path 43. Therefore, it is possible to satisfactorily cool those components, to prevent malfunctions of the circuits, and to thereby improve reliability.

11) In particular, since cooling air flows through the resin cover 185 in the first power supply block cooling flow path 41, it is possible to more reliably cool the lamp driving substrate 18 while maintaining the flow rate of the cooling air.

12) A pair of driver boards 11(11A and 11B) are provided separately from each other, and a space between the driver boards 11A and 11B forms a part of the optical modulation device cooling flow path 43. Therefore, it is also possible to reliably maintain the flow rate of cooling air that flows therebetween. For this reason, it is possible to efficiently cool the elements mounted on the opposing surfaces thereof that face the optical modulation device cooling flow path 43, to prevent malfunctions of the circuits, and to thereby further improve reliability.

13) Since the respective exhaust fans 16 are controlled based on the conditions detected by the temperature sensors 9025 in the respective cooling flow paths 41 to 43, they may be both simultaneously driven, or only one of them may be driven to perform proper cooling in accordance with the heating conditions of the components, which is economical.

14) When a pair of exhaust fans 16 are provided, they can be small. In particular, the size of the fan in the axial direction, or the direction of the outer diameter is made smaller than in a case in which there is provided a single fan having the performance corresponding to those of both the exhaust fans 16. This makes it possible to reduce the longitudinal or vertical size of the device 1, and to further promote size reduction.

The present invention is not limited to the above embodiment, and includes other constructions and the like that can achieve the object of the present invention. The present invention also includes the following modifications and the like.

While the surface of the fan frame 22 that faces the prism bearing face 903C is nearly square in outline in the above embodiment, it is satisfactory for the outline to be shaped nearly like a quadrangle. For example, the outline may be rhombic. When the quadrangle is excessively irregular, however, the intake fan 17C is not stably held by the fan frame 22. Therefore, it is preferable that the intersection angle of two diagonal lines of the quadrangle be approximately right angles.

The shape nearly like a quadrangle also includes not only a quadrangle having chamfered corners as in the above embodiment, but also a quadrangle in which all or some of the sides are curved. That is, it is satisfactory for the quadrangle to be shaped with four apexes and two diagonal lines linking the apexes.

While the fan frame 22 is mounted on the head body 903 in the above embodiment, when it is mounted on the inner side of the lower casing 4 instead, advantages similar to those of the above embodiment can be obtained.

While the fan frame 22 is fixed to the head body 903 at two points nearly along the diagonal line 22B in the above embodiment, it may be fixed at four points.

While there are provided a pair of exhaust fans 16 in the above embodiment, the number of exhaust fans may be one, three, or more. It is, however, preferable that at least two exhaust fans be provided, because the above-described advantages 13) and 14) can be obtained.

While the respective cooling flow paths 41 to 43 pass through the light-source lamp unit 8 (light-source lamp 181) in the above embodiment, the present invention is not limited to the above structure, and also includes, for example, a case in which some of the cooling flow paths 41 to 43 pass through the light-source lamp unit 8, and a case in which none of them pass therethrough. It is, however, preferable that they pass as in the above embodiment, because the above-described advantage 9) can be obtained.

While cooling air flows between the upper and lower driver boards 11A and 11B in the above embodiment, this does not apply to, for example, a case in which the driver boards are replaced with a single board for size reduction. Furthermore, while the driver boards 11, the main board 12, and the lamp driving substrate 18 are disposed in the respective cooling flow paths 41 to 43, it may be appropriately determined whether or not to place such circuit substrates in the cooling flow paths.

While the intake fans 17A to 17C are provided for the cooling flow paths 41 to 43, respectively, for example, cooling air in all the cooling flow paths may be drawn in and exhausted by an exhaust fan, as in the light source cooling flow path 44. In short, it is satisfactory in the invention that independent cooling flow paths be formed respectively for the power supply blocks and the optical modulation device, regardless of the presence or absence of the intake fan.

As described above, according to the present invention, since the fan frame for holding the fan is mounted along the plane that includes the optical axis of the projection lens and is orthogonal to the prism bearing face, it can be mounted close to the projection lens side. This promotes size reduction.

What is claimed is:

1. A projector having three optical modulation devices that respectively modulate three color beams, a color synthesizing optical system that synthesizes the three color beams modulated by said optical modulation devices, and a projection lens that projects the light beams synthesized by said color synthesizing optical system, said color synthesizing optical system having a prism with two wavelength selective films arranged nearly in the shape of an X, said three optical modulation devices facing three side faces of said prism, said projector display device comprising:

a head body having said prism, said three optical modulation devices, and said projection lens mounted thereon, said prism being mounted on a prism bearing face of said head body;

a fan disposed on an opposite side of the prism bearing face of said head body from said prism; and a fan frame attached on said prism bearing face at a plurality of points so as to hold said fan, said fan frame having a surface that faces said prism bearing face and is shaped substantially in a quadrangle shape, and one of two diagonal lines passing through opposite corners of said quadrangle extends nearly along a plane that includes an optical axis of said projection lens, said plane being orthogonal to said prism bearing face.

2. The projector according to claim 1, said fan frame being attached to said prism bearing face at corners nearly along the other diagonal line of said quadrangle.

3. The projector according to claim 1, said fan being placed so that a line linking a center of said prism and a center of said fan is nearly perpendicular to said prism bearing face.

4. The projector according to claim 1, said quadrangle being a square.

5. The projector according to claim 1, further comprising an outer casing of said projection display device being provided with a substantially quadrangular fan opening that contains said fan frame.

6. The projector according to claim 1, said fan being an intake fan, and said fan opening being an air inlet.

7. The projector according to claim 1, further comprising a cover covering said fan.

* * * * *

UNITED STATES PATENT AND TRADEMARK OFFICE
CERTIFICATE OF CORRECTION

PATENT NO. : 6,139,155  
DATED : October 31, 2000  
INVENTOR(S) : Takeshi Takizawa It is certified that error appears in the above-identified patent and that said Letters Patent is hereby corrected as shown below:

<u>Title page,</u>
Item [54], in the Title: delete the current title and insert therefor:
-- PROJECTOR --.
Item [30], Foreign Application Priority Data, change "10-192147" to -- 10-192142 --.

Signed and Sealed this

Sixteenth Day of July, 2002

Attest:

JAMES E. ROGAN
*Attesting Officer*      *Director of the United States Patent and Trademark Office*